July 4, 1944.  D. E. GARR  2,352,619
ELECTRICAL SYSTEM
Filed Oct. 17, 1942
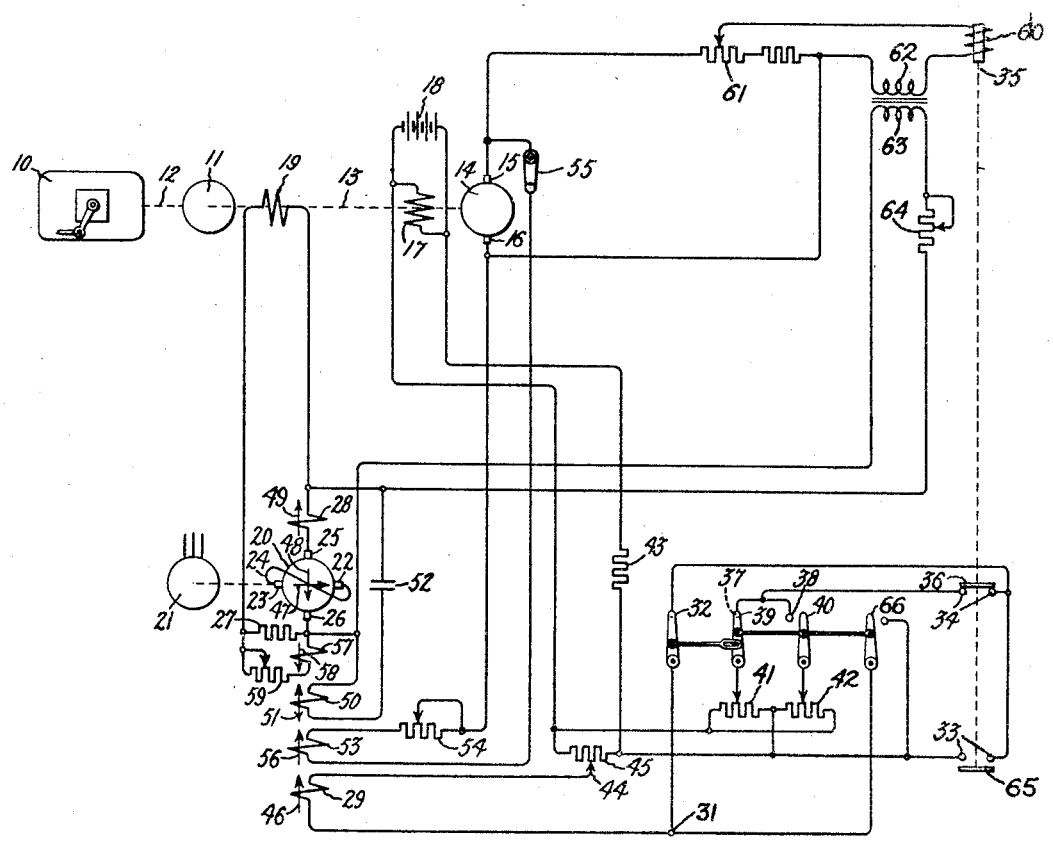
Inventor:
Donald E. Garr,
by Harry E. Dunham
His Attorney.

Patented July 4, 1944

2,352,619

UNITED STATES PATENT OFFICE 2,352,619

ELECTRICAL SYSTEM

Donald E. Garr, Schenectady, N. Y., assignor to General Electric Company, a corporation of New York Application October 17, 1942, Serial No. 462,392

19 Claims. (Cl. 171—223)

My invention relates to electrical systems such as are used for testing prime movers.

An object of my invention is to provide an improved electrical system for controlling dynamo-electric machines.

Another object of my invention is to provide an improved electrical system for the control of prime mover testing generators such as dynamometers.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, the figure schematically illustrates an electrical system embodying my invention for the control of a dynamometer used in testing an internal combustion engine.

Referring to the drawing, I have shown a prime mover 10, such as an internal combustion engine, arranged to drive a rotatable member 11 of a dynamo-electric machine, such as an inductor type eddy current generator, arranged as a dynamometer for testing the engine. The rotatable member 11 is adapted to be driven by the prime mover 10 by a shaft or other suitable connection 12 and is also connected by another suitable connection, such as a shaft 13, to the rotatable member or armature 14 of an auxiliary direct-current tachometer generator. This tachometer armature 14 is provided with a winding connected to a commutator with which brushes 15 and 16 form an electrical contact. Excitation is provided to the armature 14 by a field exciting winding 17 which is energized by a suitable substantially constant voltage source of electrical power supply, such as a battery 18. The excitation provided by the field exciting winding 17 is substantially constant anad is such that the machine is adapted to operate normally as a magnetically unsaturated machine, such that the voltage across the brushes 14 and 15 is substantially proportional to the speed of the armature 14 and, therefore, substantially proportional to the speed of the dynamometer rotatable member 11.

The dynamometer is provided with a field exciting winding 19 which is arranged to be excited by an amplidyne exciter generator having an armature 20 driven at a substantially constant speed by any suitable source of mechanical power, such as the motor 21. This is the main exciter of the system and is of the armature reaction excited type, such as an amplidyne generator, and is provided with an armature winding connected to a commutator with which a set of primary brushes 22 and 23 forms an electrical contact. These primary brushes 22 and 23 are connected together by a short-circuiting conductor 24 to complete a primary circuit through the winding of the armature 20. A set of secondary brushes 25 and 26 is electrically displaced about the commutator from the primary brushes 22 and 23 to provide a secondary circuit through the winding of the armature 20, and these brushes are connected to the dynamometer field exciting winding 19 through a potentiometer or resistance 27 and a compensating field exciting winding 28. The main or reference component of excitation is provided to the amplidyne exciter by a reference or main field exciting winding 29 which is adapted to be connected to any suitable substantially constant voltage source of electrical power supply through a control circuit. One terminal 30 of the reference field exciting winding 29 is connected to one terminal of the battery 18, and the other terminal 31 of the field exciting winding 29 is connected to a control circuit which includes a manually operable switch 32 connected to two sets of contacts 33 and 34 of a speed responsive relay 35. The contacts 34 are normally closed by a contactor 36 of the speed responsive relay 35 and are connected to contacts 37 and 38 of a pair of switches. These switches are provided with contactors 39 and 40, which are connected to a high torque control resistor 41 and to a low torque control resistor 42, respectively. During normal operation when switch 32 is closed, either one of the contactors 39 or 40 is adapted to be closed on one of the contacts 37 or 38, respectively, to provide either a high or a low energization to the reference field exciting winding 29 by placing either the resistance 41 or the resistance 42 in circuit with the reference field exciting winding 29 and the other terminal of the battery 18. The resistors 41 and 42 both are of the variable type, so that the energization of the reference field exiting winding 29 may be controlled within a predetermined range for each resistor. A current limiting resistor 43 also is connected in series with the battery 18 and the reference field exciting winding 29 in order to limit the maximum energizing current which can flow through this circuit. Further control of the field exciting winding can be obtained by varying a potential of the terminal 30 thereof, as this terminal is connected to a potentiometer terminal 44 of a potentiometer or variable resistance 45. The reference field exciting winding 29 is arranged to provide a component of excitation indicated by the arrow 46 along the secondary brush commutating axis of the armature 20, and this component of excitation 46 induces a voltage between the primary brushes 22 and 23 of the machine which causes a primary current to flow through the primary circuit of the exciter. This primary current produces a primary component 47 of armature reaction which is cut by the armature winding conductors between the secondary brushes 25 and 26. This induces a voltage between the secondary brushes 25 and 26 which causes a current to flow through the armature secondary circuit, the exciter compensating field exciting winding 28, the dynamometer field exciting winding 19, and the resistor 27. This secondary armature current produces a secondary component 48 of armature reaction which opposes the excitation 46 of the reference field exciting winding 29. In order to minimize the excitation required of the reference field exciting winding 29, the compensating field exciting winding 28 is connected to the secondary brush 25 so that it is energized by the secondary armature current, and this field exciting winding 28 is arranged to provide a component 49 of excitation along the secondary brush commutating axis of the exciter in opposition and substantially equal to the secondary component 48 of armature reaction. In order to minimize transient variations in the circuit of the exciter, an anti-hunt or stabilizing field exciting winding 50 is arranged to provide a component of excitation along the secondary brush commutating axis of the exciter, and the excitation 51 provided by this field exciting winding may be in either direction, as this field exciting winding is connected across the secondary terminals of the exciter through a condenser 52. This field exciting winding normally is deenergized and provides a component of excitation in opposition to transient variations in the excitation of the exciter along the secondary brush commutating axis thereof, thereby tending to dampen out such transient variations.

In testing certain types of prime movers, it is desirable that the dynamometer should have a rising torque characteristic with an increase in speed. This may be obtained by increasing the excitation provided by the dynamometer field exciting winding 19 with an increase in the dynamometer speed, and this increase in the excitation provided by the field exciting winding 19 may be obtained by increasing its energization. The desired increase in the energization of the field exciting winding 19 is obtained by varying the excitation along the secondary brush commutating axis of the amplidyne exciter responsive to variations in the speed of the dynamometer rotatable member 11. This is obtained by providing the amplidyne exciter with a speed responsive field exciting winding 53 which is connected through a variable control resistor 54 and a switch 55 across the terminals of the tachometer generator armature 14, thereby energizing the speed responsive field exciting winding 53 by a voltage which is responsive to the speed of the rotatable member 11 of the dynamometer. This field exciting winding 53 provides a component of excitation 56 along the secondary brush commutating axis of the amplidyne exciter which is cumulative to the component 46 of excitation provided by the reference field exciting winding 29. This field exciting winding may be used or may remain deenergized by closing or opening the switch 55 respectively, depending upon the type of prime mover which it is desired to test.

In order to maintain substantially constant the energization of the field exciting winding 19 for a given energization of the control circuit of the reference field exciting winding 29, I provide an auxiliary field exciting winding 57 which is arranged to produce a component of excitation 58 along the secondary brush commutating axis of the amplidyne exciter in opposition to the component 46 of excitation produced by the reference field exciting winding 29. This field exciting winding 57 is energized in response to the energizing current of the dynamometer field exciting winding 19 by being connected across the resistor 27 in series with the field exciting winding 19, and the energization of the field exciting winding 57 is controllable by a variable resistor 59 connected in series therewith. The arrangement of this field exciting winding is such that its component 58 of excitation increases with an increase in the energization of the field exciting winding 19 until a predetermined balance is reached between the excitation provided by this field exciting winding 57 and the reference field exciting winding 29, such that the difference in the components of excitation provided by these two field exciting windings is just sufficient to provide the desired secondary voltage in the amplidyne exciter. With this arrangement, the field exciting winding 57 provides a component of excitation to the exciter which maintains a predetermined different energization of the dynamometer field exciting winding 19 for correspondingly different predetermined energizations of the exciter reference field exciting winding 29. If the energizing current of the field exciting winding 29 decreases from any cause, such as heating of the field exciting winding, the secondary voltage of the amplidyne exciter and, consequently, the energizing current of the dynamometer field exciting winding 19, will decrease correspondingly. This will result in a decrease in the energization of the field exciting winding 57 and, consequently, in the excitation 58 produced thereby, thus providing substantially the same net difference in excitation along the amplidyne exciter secondary brush commutating axis between the components 58 and 46 of excitation, with the result that the secondary voltage of the amplidyne exciter increases and returns to substantially its original value. In addition, this arrangement assures a more rapid response of the dynamometer, as the field exciting winding 19 has a relatively high inductance and, therefore, its current and that of field exciting winding 57 is relatively low when first energized. This results in a relatively high exciter secondary voltage which assists in building up more rapidly the field produced by the winding 19.

If the speed of the dynamometer tends to increase above a predetermined safe operating value, it is desired that its torque should increase to prevent a further increase in the speed of the driving engine 10. This is obtainable by connecting an exciting coil 60 of the relay 35 across the brushes 15 and 16 of the tachometer generator through a variable resistor 61 for controlling the energization of the relay coil 60 and therefore the predetermined maximum speed of the generator 11 and connecting these in series with a secondary winding 62 of a transformer. The primary winding 63 of the transformer is connected across the secondary terminals of the amplidyne exciter in series with a variable resistor 64. With this arrangement, if the speed of the engine 10 exceeds a predetermined maximum safe operating value, the voltage of the tachometer generator across its brushes 15 and 16 increases to a value such that the energization of the relay exciting coil 60 operates the speed responsive relay 35, thereby opening the circuit between the contacts 34 and closing the circuit between the contacts 33 by a relay contactor 65. This places the reference field exciting winding 29 substantially directly across the battery 18 in series with the current limiting resistor 43, and thereby increases the excitation of the amplidyne exciter, resulting in an increase in the energization of the dynamometer field exciting winding 19 which increases the torque of the dynamometer and prevents the operation of the prime mover 10 above the predetermined safe operating speed. The arrangement of the transformer windings 62 and 63 is such that a relatively high voltage is induced in the secondary winding 62 in opposition to the voltage of the tachometer generator responsive to an increase in the secondary voltage of the amplidyne exciter, and thereby produces a substantial deenergization of the relay exciting coil 60. This results in a closing of the circuit across the relay contacts 34 and an opening of the circuit across the relay contacts 33, thereby returning the control of the reference field exciting winding 29 to its original condition. This produces a decrease in the secondary voltage of the amplidyne exciter and a consequent decrease in the voltage induced in the secondary winding 62 of the transformer, such that if the tachometer generator is still operating above the predetermined safe operating speed, the exciting winding 60 of the speed responsive relay 35 again is energized. With this circuit, the relay vibrates at a relatively high frequency and intermittently or periodically applies full energization to the exciter main or reference field exciting winding above a predetermined generator speed until the speed of the engine is reduced to a value equal to or lower than its maximum safe operating speed. In an inductor dynamometer, the residual magnetism generally is very high and the torque absorbed cannot be reduced to zero without reversal of its exciting field. Such reversal is obtained by closing a switch 66 which opens switch 32 and switches 39 and 40 as these are all suitably interconnected and reverses the energization of the reference field exciting winding 29 by reversing its connections across the battery 18, thereby reducing the excitation of the dynamometer as desired.

While I have illustrated and described a particular embodiment of my invention, modifications thereof will occur to those skilled in the art. I desire it to be understood, therefore, that my invention is not to be limited to the particular arangement disclosed, and I intend in the appended claims to cover all modifications which do not depart from the spirit and scope of my invention.

What I claim as new and desire to secure by Letters Patent of the United States is:

1. An electrical system including a main dynamo-electric machine having a field exciting winding, an exciter arranged to energize said main dynamo-electric machine field exciting winding, means including a main field exciting winding for providing a component of excitation to said exciter, and means including a second field exciting winding arranged to provide a component of excitation to said exciter along the same axis as said exciter main field exciting winding for substantially maintaining a different predetermined energization of said dynamo-electric machine field exciting winding for correspondingly different predetermined energizations of said exciter main field exciting winding.

2. An electrical system including a main dynamo-electric machine having a field exciting winding, means for energizing said main dynamo-electric machine field exciting winding, said means including a main control reference member, means for controlling the electrical energization of said main reference member, means including a second control member cumulative to said main control member, means responsive to the speed of said main dynamo-electric machine for energizing said second control member, and means including a third control member for substantially maintaining a different predetermined energization of said dynamo-electric machine field exciting winding for correspondingly different predetermined energizations of said main control member.

3. An electrical system including a main dynamo-electric machine having a field exciting winding, an exciter arranged to energize said main dynamo-electric machine field exciting winding, means including a main field exciting winding for providing a component of excitation to said exciter, means for controlling the energization of said exciter main field exciting winding, means for automatically providing full energization to said exciter main field exciting winding above a predetermined speed of said main dynamo-electric machine, and means including a second field exciting winding arranged to provide a component of excitation to said exciter along the same axis as said exciter main field exciting winding for substantially maintaining a different predetermined energization of said dynamo-electric machine field exciting winding for correspondingly different predetermined energizations of said exciter main field exciting winding.

4. An electrical system including a main dynamo-electric machine having a field exciting winding, an exciter arranged to energize said main dynamo-electric machine field exciting winding, means including a main field exciting winding for providing a component of excitation to said exciter, means for intermittently applying full energization to said exciter main field exciting winding above a predetermined speed of said main dynamo-electric machine, and means including a second field exciting winding arranged to provide a component of excitation to said exciter in opposition to said exciter main field exciting winding for maintaining a predetermined relationship between the energization of said dynamo-electric machine field exciting winding and the energization of said exciter main field exciting winding.

5. An electrical system including a main dynamo-electric machine having a field exciting winding, means for energizing said main dynamo-electric machine field exciting winding, said means including a main control reference member, means for controlling the electrical energization of said main control member, means for intermittently providing full energization to said main control member above a predetermined speed of said main dynamo-electric machine, means including a second control member cumulative to said main control member, means responsive to the speed of said main dynamo-electric machine for energizing said second control member, and means including a third control member for maintaining a predetermined relationship between the energization of said dynamo-electric machine field exciting winding and the energization of said main control member.

6. An electrical system including a main dynamo-electric machine having a field exciting winding, an exciter arranged to energize said main dynamo-electric machine field exciting winding, means including a main field exciting winding for providing a component of excitation to said exciter, means for controlling the energization of said exciter main field exciting winding, means including a second field exciting winding for providing a component of excitation to said exciter cumulative to the excitation of said main field exciting winding, means responsive to the speed of said main dynamo-electric machine for energizing said second field exciting winding, and means including a third field exciting winding arranged to provide a component of excitation to said exciter along the same axis as said exciter main field exciting winding for substantially maintaining a different predetermined energization of said dynamo-electric machine field exciting winding for correspondingly different predetermined energizations of said exciter main field exciting winding.

7. An electrical system including a main dynamo-electric machine having a field exciting winding, an exciter arranged to energize said main dynamo-electric machine field exciting winding, means including a main field exciting winding for providing a component of excitation to said exciter, means for intermittently applying full energization to said exciter main field exciting winding above a predetermined speed of said main dynamo-electric machine, means including a second field exciting winding for providing a component of excitation to said exciter cumulative to the excitation of said main field exciting winding, means responsive to the speed of said main dynamo-electric machine for energizing said second field exciting winding, and means including a third field exciting winding arranged to provide a component of excitation to said exciter in opposition to said exciter main field exciting winding for maintaining a predetermined relationship between the energization of said dynamo-electric machine field exciting winding and the energization of said exciter main field exciting winding.

8. An electrical system including a main dynamo-electric machine having a field exciting winding, an exciter arranged to energize said main dynamo-electric machine field exciting winding, means including a main field exciting winding for providing a component of excitation to said exciter, means including a second field exciting winding for providing a component of excitation to said exciter cumulative to the excitation of said main field exciting winding, means responsive to the speed of said main dynamo-electric machine for energizing said second field exciting winding, and means including a third field exciting winding arranged to provide a component of excitation to said exciter along the same axis as said exciter main field exciting winding for substantially maintaining a different predetermined energization of said dynamo-electric machine field exciting winding for correspondingly different predetermined energizations of said exciter main field exciting winding.

9. An electrical system including a main dynamo-electric machine having a field exciting winding, an exciter arranged to energize said main dynamo-electric machine field exciting winding, means including a main field exciting winding for providing a component of excitation to said exciter, means including a second field exciting winding for providing a component of excitation to said exciter cumulative to the excitation of said main field exciting winding, means responsive to the speed of said main dynamo-electric machine for energizing said second field exciting winding, and means including a third field exciting winding arranged to provide a component of excitation to said exciter in opposition to said exciter main field exciting winding for substantially maintaining a different predetermined energization of said dynamo-electric machine field exciting winding for correspondingly different predetermined energizations of said main exciter field exciting winding.

10. An electrical system including a main dynamo-electric machine having a field exciting winding, an exciter arranged to energize said main dynamo-electric machine field exciting winding, means including a main field exciting winding for providing a component of excitation to said exciter, means for controlling the energization of said exciter main field exciting winding, means for intermittently providing full energization to said exciter main field exciting winding above a predetermined speed of said main dynamo-electric machine, means including a second field exciting winding for providing a component of excitation to said exciter cumulative to the excitation of said main field exciting winding, means responsive to the speed of said main dynamo-electric machine for energizing said second field exciting winding, and means including a third field exciting winding arranged to provide a component of excitation to said exciter along the same axis as said exciter main field exciting winding for maintaining a predetermined relationship between the energization of said dynamo-electric machine field exciting winding and the energization of said exciter main field exciting winding.

11. An electrical system including a main dynamo-electric machine having a field exciting winding, an exciter arranged to energize said main dynamo-electric machine field exciting winding, means including a main field exciting winding for providing a component of excitation to said exciter, means for controlling the energization of said exciter main field exciting winding, means for intermittently applying full energization to said exciter main field exciting winding above a predetermined speed of said main dynamo-electric machine, means including a second field exciting winding for providing a component of excitation to said exciter cumulative to the excitation of said main field exciting winding, means responsive to the speed of said main dynamo-electric machine for energizing said second field exciting winding, and means including a third field exciting winding arranged to provide a component of excitation to said exciter in opposition to said exciter main field exciting winding for maintaining a predetermined relationship between the energization of said dynamo-electric machine field exciting winding and the energization of said exciter main field exciting winding.

12. An electrical system including a main dynamo-electric machine having a field exciting winding, an exciter arranged to energize said main dynamo-electric machine field exciting winding, means including a main field exciting winding for providing a component of excitation to said exciter, means for automatically providing full energization to said exciter main field exciting winding above a predetermined speed of said main dynamo-electric machine, means including a second field exciting winding for providing a component of excitation to said exciter cumulative to the excitation of said main field exciting winding, means responsive to the speed of said main dynamo-electric machine for energizing said second field exciting winding, and means including a third field exciting winding arranged to provide a component of excitation to said exciter along the same axis as said exciter main field exciting winding for substantially maintaining a different predetermined energization of said dynamo-electric machine field exciting winding for correspondingly different predetermined energizations of said exciter main field exciting winding.

13. A prime mover electrical testing system including a main generator adapted to be driven by a prime mover, a field exciting winding for said main generator, an exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said exciter for providing a component of excitation thereto along the secondary brush commutating axis thereof, means including a second field exciting winding for providing a component of excitation along the secondary brush commutating axis of said exciter in opposition to the excitation of said exciter main field exciting winding, and means for energizing said exciter second field exciting winding for substantially maintaining a different predetermined energization of said generator field exciting winding for correspondingly different predetermined energizations of said exciter main field exciting winding.

14. A prime mover electrical testing system including a main generator adapted to be driven by a prime mover, a field exciting winding for said main generator, an exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said exciter for providing a component of excitation thereto along the secondary brush commutating axis thereof, means for intermittently providing full energization to said exciter field exciting winding above a predetermined speed of said main generator, means including a second field exciting winding for providing a component of excitation along the secondary brush commutating axis of said exciter in opposition to the excitation of said exciter main field exciting winding, and means for energizing said second field exciting winding for maintaining a predetermined relationship between the energization of said generator field exciting winding and the energization of said exciter main field exciting winding.

15. An electrical testing system including a main generator, a field exciting winding for said main generator, an exciter having an armature provided with a winding and a commutator connected thereto, a set of primary brushes and a set of secondary brushes displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said exciter for providing a component of excitation thereto along the secondary brush commutating axis thereof, means for controlling the energization of said exciter main field exciting winding, a second field exciting winding arranged to provide a component of excitation along said secondary brush commutating axis cumulative to the excitation of said exciter main field exciting winding, means responsive to the speed of said main generator for energizing said exciter second field exciting winding, means including a third field exciting winding for providing a component of excitation along the secondary brush commutating axis of said exciter in opposition to the excitation of said exciter main field exciting winding, and means for energizing said third field exciting winding for substantially maintaining a different predetermined energization of said generator field exciting winding for correspondingly different predetermined energizations of said exciter main field exciting winding.

16. A prime mover electrical testing system including a main generator driven by said prime mover, a field exciting winding for said main generator, an exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said exciter for providing a component of excitation thereto along the secondary brush commutating axis thereof, a second field exciting winding arranged to provide a component of excitation along said secondary brush commutating axis cumulative to the excitation of said exciter main field exciting winding, means responsive to the speed of said main generator for energizing said exciter second field exciting winding, means including a third field exciting winding for providing a component of excitation along the secondary brush commutating axis of said exciter in opposition to the excitation of said exciter main field exciting winding, and means for energizing said third field exciting winding for substantially maintaining a different predetermined energization of said generator field exciting winding for correspondingly different predetermined energizations of said exciter main field exciting winding.

17. A prime mover electrical testing system including a main generator adapted to be driven by a prime mover, a field exciting winding for said main generator, an exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said exciter for providing a component of excitation thereto along the secondary brush commutating axis thereof, a second field exciting winding arranged to provide a component of excitation along said secondary brush commutating axis of said exciter substantially equal and opposite to the secondary component of armature reaction due to current in said secondary armature circuit, means including a third field exciting winding for providing a component of excitation along the secondary brush commutating axis of said exciter in opposition to the excitation of said exciter main field exciting winding, and means for energizing said third field exciting winding for substantially maintaining a different predetermined energization of said generator field exciting winding for correspondingly different predetermined energizations of said exciter main field exciting winding.

18. A prime mover electrical testing system including a main generator adapted to be driven by a prime mover, a field exciting winding for said main generator, an exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said exciter for providing a component of excitation thereto along the secondary brush commutating axis thereof, means for automatically providing full energization to said exciter field exciting winding above a predetermined speed of said main generator, a second field exciting winding arranged to provide a component of excitation along said secondary brush commutating axis of said exciter substantially equal and opposite to the secondary component of armature reaction due to current in said secondary armature circuit, means including a third field exciting winding for providing a component of excitation along the secondary brush commutating axis of said exciter in opposition to the excitation of said exciter main field exciting winding, and means for energizing said third field exciting winding for substantially maintaining a different predetermined energization of said generator field exciting winding for correspondingly different predetermined energizations of said exciter main field exciting winding.

19. A prime mover electrical testing system including a main generator adapted to be driven by a prime mover, a field exciting winding for said main generator, an exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said exciter for providing a component of excitation thereto along the secondary brush commutating axis thereof, means for automatically providing full energization to said exciter main field exciting winding above a predetermined speed of said main generator, a second field exciting winding arranged to provide a component of excitation along said secondary brush commutating axis cumulative to the excitation of said exciter main field winding, means responsive to the speed of said main generator for energizing said exciter second field exciting winding, means including a third field exciting winding for providing a component of excitation along the secondary brush commutating axis of said exciter in opposition to the excitation of said exciter main field exciting winding, and means for energizing said third field exciting winding for substantially maintaining a different predetermined energization of said generator field exciting winding for correspondingly different predetermined energizations of said exciter main field exciting winding.

DONALD E. GARR.